July 21, 1925. 1,546,743
W. C. NABORS
TRAILER ATTACHMENT FOR MOTOR TRUCKS
Filed June 20, 1924 2 Sheets-Sheet 1
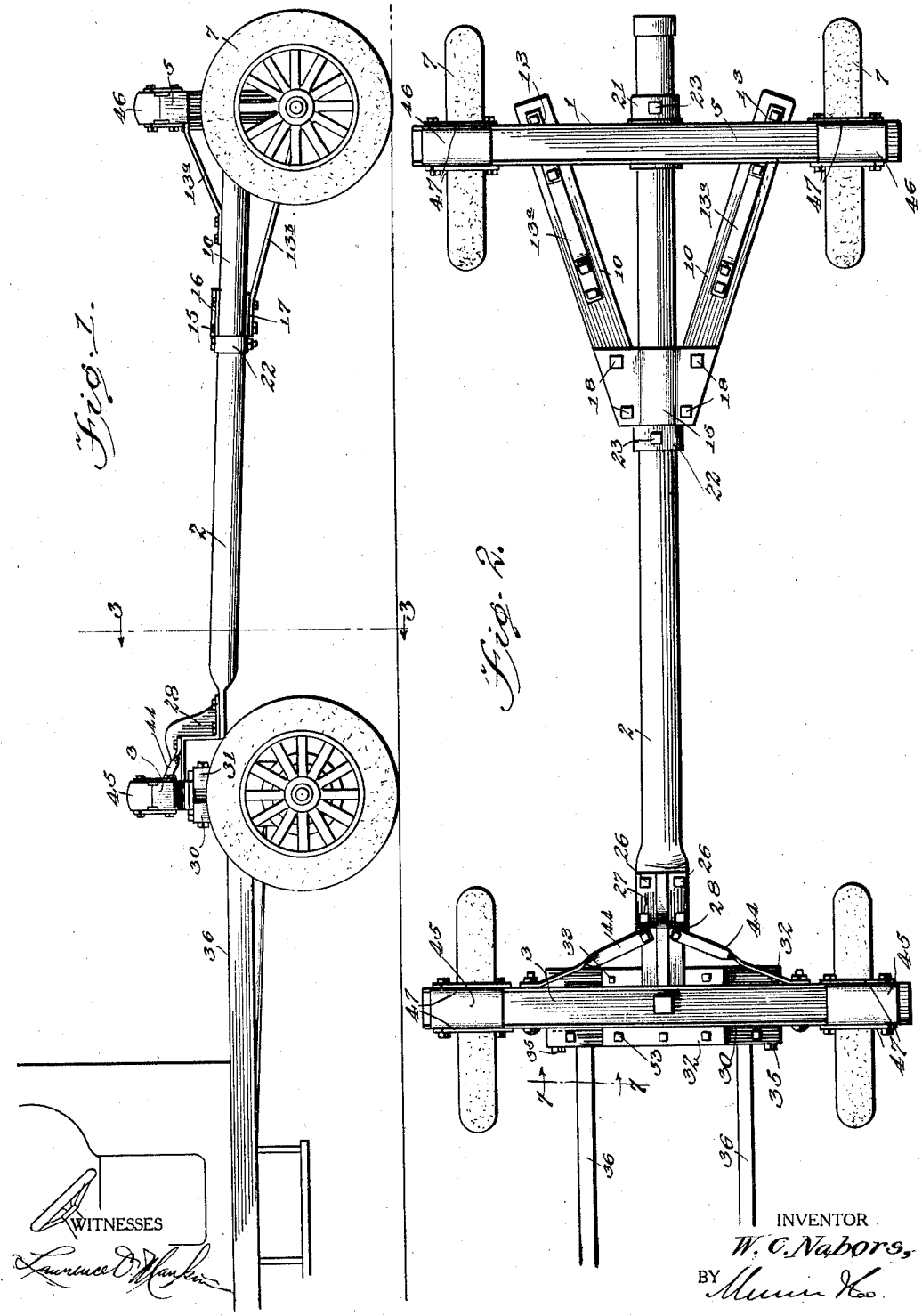
INVENTOR
W. C. Nabors,
BY
ATTORNEYS.

July 21, 1925.
W. C. NABORS
1,546,743
TRAILER ATTACHMENT FOR MOTOR TRUCKS
Filed June 20, 1924
2 Sheets-Sheet 2
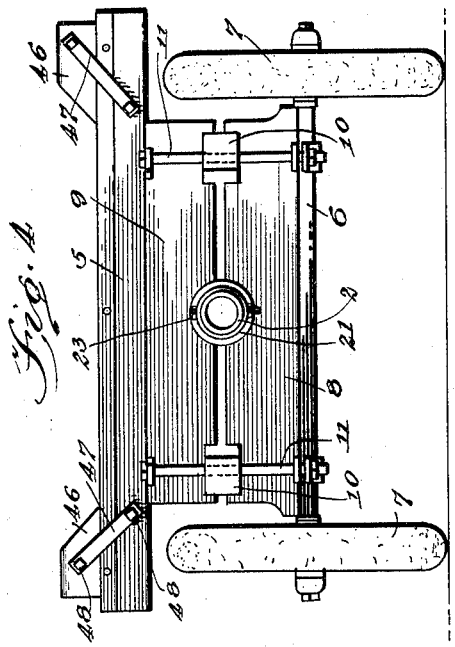
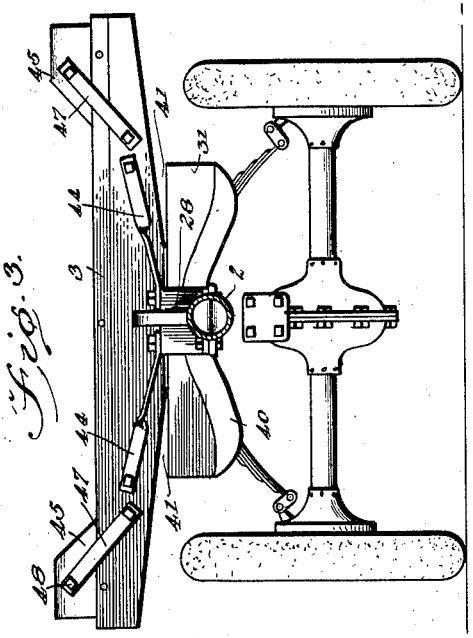
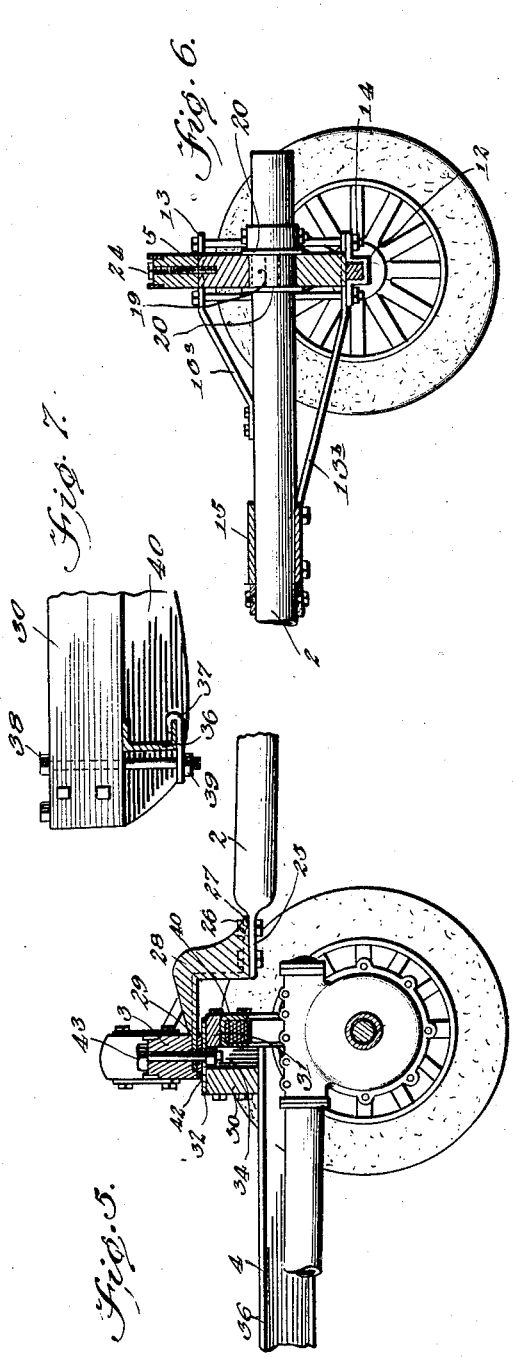
WITNESSES
INVENTOR
W. C. Nabors,
BY
ATTORNEYS Patented July 21, 1925.

1,546,743

UNITED STATES PATENT OFFICE.

WILLIAM CAMPBELL NABORS, OF MANSFIELD, LOUISIANA.

TRAILER ATTACHMENT FOR MOTOR TRUCKS.

Application filed June 20, 1924. Serial No. 721,261.

*To all whom it may concern:*

Be it known that I, WILLIAM C. NABORS, a citizen of the United States, residing at Mansfield, in the parish of De Soto, State of Louisiana, have invented certain new and useful Improvements in Trailer Attachments for Motor Trucks, of which the following is a specification.

My invention is an improvement in trailer attachments for motor trucks, and it consists in the combinations, constructions and arrangements herein described and claimed.

An object of the invention is to provide a trailer attachment which comprises a truck and means whereby the truck may be connected adjustably to the frame of a motor truck of a well known type of construction without there being any necessity of making any changes in the usual construction of the motor truck.

A further object of the invention is to provide a trailer attachment of the character described which affords facilities for connecting a trailer truck to the frame of a motor vehicle so that the trailer truck can rock transversely without causing any appreciable strain of the connecting means or the frame of the motor vehicle.

A still further object of the invention is to provide a trailer attachment which is adapted for use in the transportation of logs and which comprises a log supporting member positioned on the rear truck of the motor vehicle and means for connecting the log supporting member with a second log supporting member on the trailer truck so that the distance between the two log supporting members will remain practically constant irrespective of the angular relation of the longitudinal axis of the trailer attachment to the longitudinal axis of the associated motor truck.

Other objects and advantages will be apparent from the following description, considered in conjunction with the accompanying drawings, in which:—

Figure 1 is a side elevation showing a portion of a motor truck and a trailer attachment embodying the invention and connected with the motor truck, Figure 2 is a plan view of the trailer attachment and of the rear end portion of the motor truck, Figure 3 is a section along the line 3—3 of Figure 1, Figure 4 is a rear end view of the trailer attachment, Figure 5 is a fragmentary view, partly in vertical section and partly in side elevation, showing the means for connecting the trailer attachment to the frame of the motor frame, Figure 6 is a view, partly in side elevation and partly in vertical section showing the manner of connecting the trailer reach bar to the trailer truck, Figure 7 is a fragmentary sectional view taken substantially along the line 7—7 of Figure 2.

A trailer attachment embodying the invention comprises a trailer truck, indicated generally at 1, a reach or draw bar 2, a front bolster 3 and means connecting the reach 2, the front bolster 3 and the frame of a motor truck or tractor, indicated generally at 4, together so that the front bolster 3 will remain parallel with a rear bolster 5 which is supported upon the trailer truck and at the same time the reach 2 is permitted to swing about a vertical axis extending through the front bolster 3 and also intersecting the longitudinal axis of the motor truck.

The trailer truck 1 includes a rear axle 6 supported upon wheels 7. A support for the bolster 5 comprises a pair of horizontally disposed sill sections or beams 8 and 9, respectively, which are spaced vertically apart by vertically reduced portions of a pair of forwardly convergent rear truck frame members 10. The lower sill member 8 is superimposed upon the axle 6 and the members 8 and 9 are clamped as a unit to the axle 6 through the agency of bolts 11, straps or clips 12 which extend underneath the axle 6 and other straps 13 which extend across the upper sill member 9, the respective bolts 11 extending through vertically alined openings in corresponding portions of the straps 12 and 13 and nuts 14 being provided for engaging with the bolts 13 to hold the latter against accidental displacement. Since the vertically reduced portions of the frame members 10 extend between the sill members 8 and 9, it will be manifest that the frame members 10 also will be clamped adjacent to their rearward ends between the sill members 8 and 9 when the nuts 14 are tightened on the bolts 13 and that a rigid connection will be established between each frame member 10 and the axle 6.

The trailer truck frame members 10 have the forward end portions thereof connected to opposite sides of a bearing sleeve 15, the latter having pairs of vertically spaced laterally extending attaching portions 16 and 17, respectively, between which the forward end portions of the members 10 are received and to which the forward end portions of the members 10 are secured, as at 18. The arrangement is such that the tubular bearing member 15 will be positioned in axial alinement with the tubular bearing member 19 which is disposed between the sill members 8 and 9 directly above the axis of the axle 6. The tubular bearing 19 may be held against displacement from the position just described between the members 8 and 9 by the engagement of flanges 20 at the opposite end thereof with the front and rear faces of the members 8 and 9, respectively, and by being partially disposed in a recess in the lower face of the upper sill member 9 and partially in a similar recess or cut-away portion in the upper face of the lower sill member 8, as clearly shown in Figure 6. The draw bar or reach 2 is of tubular form for the greater part of its length and is slidable and rotatable in the alined bearings 15 and 19. Stop collars 21 and 22, respectively, may be secured on the reach 2 by set screws 23 or like fastening devices so that the collar 21 will be disposed in abutting relation to the flange 20 at the rearward end of the bearing sleeve 19 and the stop collar 22 will be similarly disposed on the reach in respect to the forward end of the bearing 15, whereby the reach will be held against axial movement in respect to the bearings 15 and 19 and in respect to the trailer truck while the axle 6 of the trailer truck and the parts supported thereon may turn or rock about the axis of the reach 2 independently of the latter.

The bolster 5 of the trailer truck is superimposed upon the sill member 9 and may be secured to the latter by cap bolts 24 or like securing devices.

The reach 2 has the forward end portion thereof flattened, as at 25, and as best seen in Figure 5. This flattened end portion of the reach is rigidly secured at 26 to a horizontal attaching portion 27 of a coupling bracket 28. The coupling bracket 28 also includes a second horizontal attaching portion, indicated at 29, which is disposed at a level higher than the flattened end portion 25 of the reach for a purpose which will presently appear.

A sill for supporting the bolster 3 on the motor truck 4 comprises two horizontally spaced members 30 and 31, respectively, connected together by a horizontal plate 32 which overlies the members 30 and 31 and is secured to the latter by suitable fastening devices, as at 33. The members 30 and 31 are maintained in horizontally spaced relation by spacer blocks, as at 34, which are disposed between end portions of the members 30 and 31. Additional securing devices connecting the members 30 and 31 together are indicated at 35 and comprise bolts which extend through the spacing blocks 34. The member 30 rests adjacent to the opposite ends upon the side members 36 of the motor truck frame. Clamps 37 have hook portions in engagement with the side members 36 of the frame of the motor truck and extend beyond the outer faces of the side members 36. Bolts 38 extend vertically through the member 30 and through the shanks of the clamps 37 in the manner illustrated in Figure 7, whereby the member 30 will be held rigid with the frame of the motor truck when nuts 39 are screwed tight on the bolts 38 against the shanks of the clamps 37. The member 31 rests upon the rear transverse member 40 of the motor truck frame and is secured to the latter by bolts 41 which extend through openings ordinarily provided in the rear transverse member 40 of a motor truck of a well known type of construction. It will thus be manifest that the sill for supporting the bolster 3 may be rigidly secured to the frame of a motor truck of a well known type of construction without any changes in the construction of the motor truck being required. The upper horizontal attaching portion 29 of the bracket 28 extends between the bolster 3 and a bearing plate 42 which is disposed upon the plate 32. A king pin 43 extends through vertically alined openings in the bolster 3, the attaching plate 42 and the plate 32, whereby the reach 2 will be connected with the sill for supporting the bolster 3 and, therefore, with the frame of the motor vehicle so that the reach 2 and the frame of the motor vehicle may swing relatively to each other about the axis of the king pin 43. It, of course, will be understood that the axis of the king pin 43 intersects the longitudinal axis of the motor vehicle so that turning of the motor vehicle from a straight forward direction will cause like movement or turning of the trailer truck. The bracket 28 is attached to the bolster 3 by a pair of brace members 44 so that the bolster 3 is not permitted to turn about the axis of the king pin 43 independently of the reach 2 and, therefore, the bolsters 3 and 5 will be maintained in parallel relation to each other at all times, irrespective of the angular relation of the reach 2 to the longitudinal axis of the motor truck.

The bolsters 3 and 5 may have end blocks superimposed thereon, as indicated at 45, for the bolster 3, and at 46 for the bolster 5, such end blocks being secured to the bolsters on which they are disposed by straps 47 and securing devices 48. The end blocks 45 and 46 serve to retain the logs or like members upon the bolsters 3 and 5 and prevent such logs from rolling about their axes from the ends of the bolsters.

From the foregoing description of the various parts of the device, the operation thereof may be readily understood. Since the bolsters 3 and 5 are kept parallel with each other and the distance between the bolsters remains substantially the same at all times, it will be manifest that no appreciable strain of the reach 2 or stress on the trailer truck or motor truck will result when the motor truck turns from a straight forward direction or the motor truck and trailer truck traverse rough and uneven surfaces. Since the trailer truck is mounted for rocking movement about the axis of the reach or draw bar 2, the wheels of the trailer truck may be disposed at different levels without causing any appreciable strain of the reach or draw bar or of the parts of the motor truck to which the reach is connected and, therefore, a rough and uneven surface can be traversed by the connected together motor truck and trailer attachment without any appreciable strain of the connected together parts of the motor truck and trailer attachment.

It will be observed that the convergent frame members 10 are stayed to the sill which supports the bolster 5 by upper bars 13ª which may be integral with the straps 13 and by lower bars 13ᵇ which are connected with the bolts 11 adjacent to their rearward ends as well as being clamped against the underface of the sill member 8 and are attached at their forward ends to the laterally extending attaching portions of the bearing member 15.

Obviously, the invention is susceptible of embodiment in forms other than that which is illustrated in the accompanying drawings and I, therefore, consider as my own all such modifications and adaptations thereof as fairly fall within the scope of the appended claims.

I claim:

1. A trailer attachment for motor trucks comprising a trailer truck having an axle mounted upon wheels, a sill supported upon said axle, said sill comprising two vertically spaced horizontal members, a tubular bearing member clamped between said sill members intermediate the length of the sill, a reach slidable and rotatable in said bearing member, means for releasably holding said reach against sliding movement in said bearing, a sill adapted to be disposed upon the frame of a motor truck, means for clamping said sill to the frame of the motor truck, a bolster supported upon said sill, a coupling bracket rigidly secured at one end to the forward end of said reach and having a portion received between said bolster and said sill, a king pin connecting said bolster to said sill and connecting said portion of the coupling bracket to said sill, and means staying said bolster to said reach.

2. A trailer attachment for motor trucks comprising a trailer truck having an axle mounted upon wheels, a sill supported upon said axle, said sill comprising two vertically spaced horizontal members, a tubular bearing member clamped between said sill members intermediate the length of the sill, a reach slidable and rotatable in said bearing member, means for releasably holding said reach against sliding movement in said bearing, a sill adapted to be disposed upon the frame of a motor truck, means for clamping said sill to the frame of the motor truck, a bolster supported upon said sill, a coupling bracket rigidly secured at one end to the forward end of said reach and having a portion received between said bolster and said sill, a king pin connecting said bolster to said sill and connecting said portion of the coupling bracket to said sill, means staying said bolster to said reach, and a second bolster secured upon said first-named sill in parallel relation to the first-mentioned bolster.

3. A trailer attachment comprising a trailer truck, a reach bar connected adjacent to its rearward end to said trailer truck, a sill adapted to be disposed upon the frame of a motor truck, said sill comprising two horizontally spaced members extending transversely of the frame of the motor truck, clamps engageable with the side members of the frame of the motor truck, bolts connecting one of said sill members to said clamps, other bolts connecting the other of said sill members to the rear transverse members of the motor truck frame, a connecting plate superimposed upon said sill members, a coupling bracket having a horizontal portion secured to the forward end of said reach and having an upwardly offset horizontal portion disposed upon said connecting plate, a bolster supported upon said connecting plate, and a king pin extending through said bolster, said upwardly offset portion of the coupling bracket and said connecting plate.

4. A trailer attachment for motor trucks comprising a trailer truck having an axle, wheels supporting said axle, a sill comprising a member extending transversely of the trailer truck and disposed upon said axle, a second sill member, a pair of forwardly convergent frame members having the rearward end portions thereof disposed between said sill members and spacing said sill members vertically, a tubular bearing member disposed between said sill members, means for clamping said sill members and said converging frame members as a unit to said axle, a second tubular bearing member secured between the forward ends of said side frame members in axial alinement with said first-named bearing member, a reach member extending slidably and rotatably through said bearing members, and stop collars adjustably engageable with said reach member at opposite ends of said bearing members for releasably holding said reach member against axial movement in said bearings.

5. A trailer attachment for motor trucks comprising a trailer truck having an axle, wheels supporting said axle, a sill comprising a member extending transversely of the trailer truck and disposed upon said axle, a second sill member, a pair of forwardly convergent frame members having the rearward end portions thereof disposed between said sill members and spacing said sill members vertically, a tubular bearing member disposed between said sill members, means for clamping said sill members and said converging frame members as a unit to said axle, a second tubular bearing member secured between the forward ends of said side frame members in axial alinement with said first-named bearing member, a reach member extending slidably and rotatably through said bearing members, stop collars adjustably engageable with said reach member at opposite ends of said bearing members for releasably holding said reach member against axial movement in said bearings, and means for staying said forwardly convergent frame members to said sill.

WILLIAM CAMPBELL NABORS.